United States Patent
Hawkins et al.

(10) Patent No.: US 7,007,239 B1
(45) Date of Patent: Feb. 28, 2006

(54) METHOD AND APPARATUS FOR ACCESSING A CONTACTS DATABASE AND TELEPHONE SERVICES

(75) Inventors: Jeffrey Charles Hawkins, Atherton, CA (US); Robert Yuj Haitani, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 496 days.

(21) Appl. No.: 09/977,871

(22) Filed: Oct. 14, 2001

Related U.S. Application Data

(63) Continuation-in-part of application No. 09/668,123, filed on Sep. 21, 2000, now Pat. No. 6,781,575.

(51) Int. Cl.
*G06F 3/14* (2006.01)
*H04M 1/247* (2006.01)

(52) U.S. Cl. ............... 715/780; 715/864; 715/776; 707/3; 707/7; 379/93.23

(58) Field of Classification Search ......... 345/781; 707/3, 7, 5, 104.1; 359/356; 715/780, 864, 715/963, 776, 781, 779, 777, 840, 968, 835; 455/414, 418, 564, 344; 379/90.01, 93.17, 379/93.19, 93.23
See application file for complete search history.

(56) References Cited

U.S. PATENT DOCUMENTS

| | | | | |
|---|---|---|---|---|
| 5,745,904 A | * | 4/1998 | King et al. .......... | 707/200 |
| 5,797,098 A | * | 8/1998 | Schroeder et al. ...... | 455/464 |
| 5,917,905 A | * | 6/1999 | Whipple et al. ....... | 379/356.01 |
| 6,389,124 B1 | * | 5/2002 | Schnarel et al. ...... | 379/93.17 X |
| 6,405,172 B1 | * | 6/2002 | Baker et al. .......... | 707/5 X |
| 6,502,090 B1 | * | 12/2002 | Raisanen ............. | 707/3 |
| 6,557,004 B1 | * | 4/2003 | Ben-Shachar et al. .... | 707/102 |

* cited by examiner

*Primary Examiner*—Raymond J. Bayerl
(74) *Attorney, Agent, or Firm*—Fenwick & West LLP

(57) ABSTRACT

Sophisticated computer-enhanced mobile telephones require intuitive user interfaces in order to allow a user to take advantage of all the available features. The present invention discloses an intuitive telephone system user interface that provides both simple familiar and new powerful user interfaces to the user. In one embodiment, the user is presented with four permanently available user interface views and a fifth user interface view that is available when there is an active telephone call. The first permanently available view is a dial pad view that is similar to a common touch tone dial pad. A second permanently available view is a speed dial view that allows users to easily create their own customized speed dial buttons that are easy to navigate between and can be edited at any time. The third view is the call history view that displays a list of previous incoming, outgoing, or missed calls and may be filtered as desired by the user. The final permanently available view is a contacts view that provides a filtering mechanism that allows the user to quickly search through a large personal contacts database. The fifth user interface view is the active call view that displays a set of command buttons for accessing advanced telephone features during a telephone call such as hold, three way calling, DTMF touch tones, hang-up, speakerphone, etc.

37 Claims, 16 Drawing Sheets

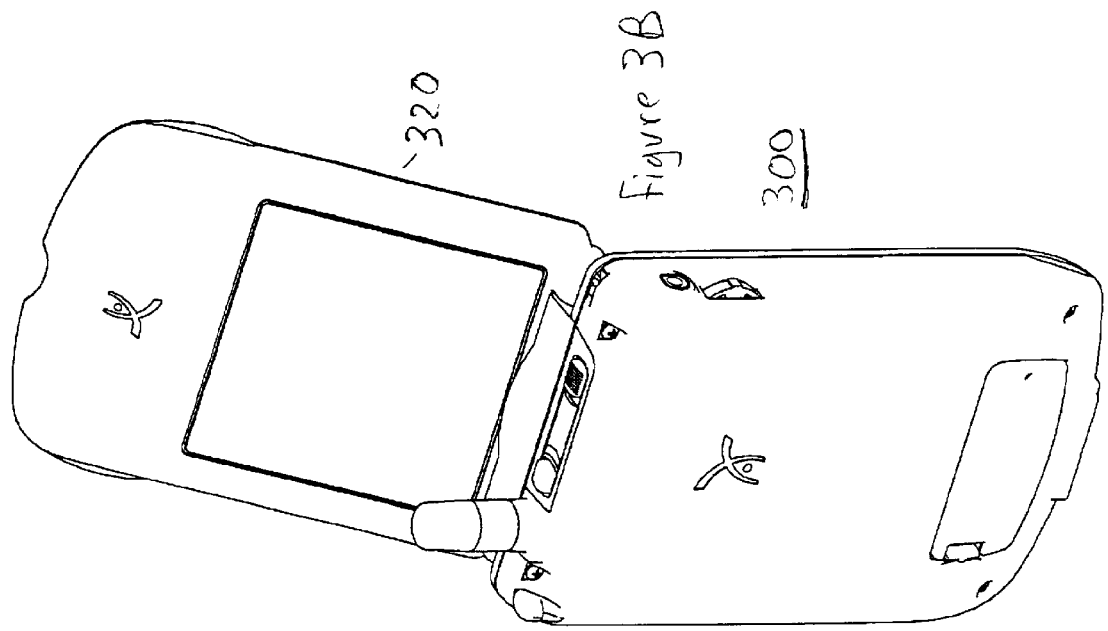
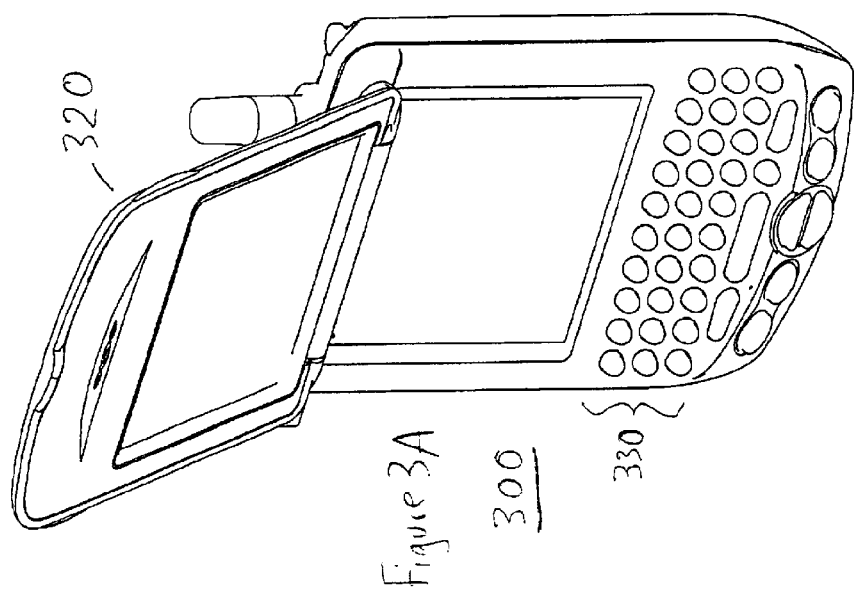

Figure 9A

Edit Entry

Name:
Number:
Extra Digits:

☐ Make Speed Dial my default view ( Done )  ( Cancel )  ( Lookup )
  ↑         ↑           ↑
 961       962         963

Figure 9B

Edit Entry

Name: Greg
Number: 650-555-7894
Extra Digits:

☐ Make Speed Dial my default view ( Done )  ( Cancel )  ( Delete )
  ↑         ↑           ↑
 961       962         963

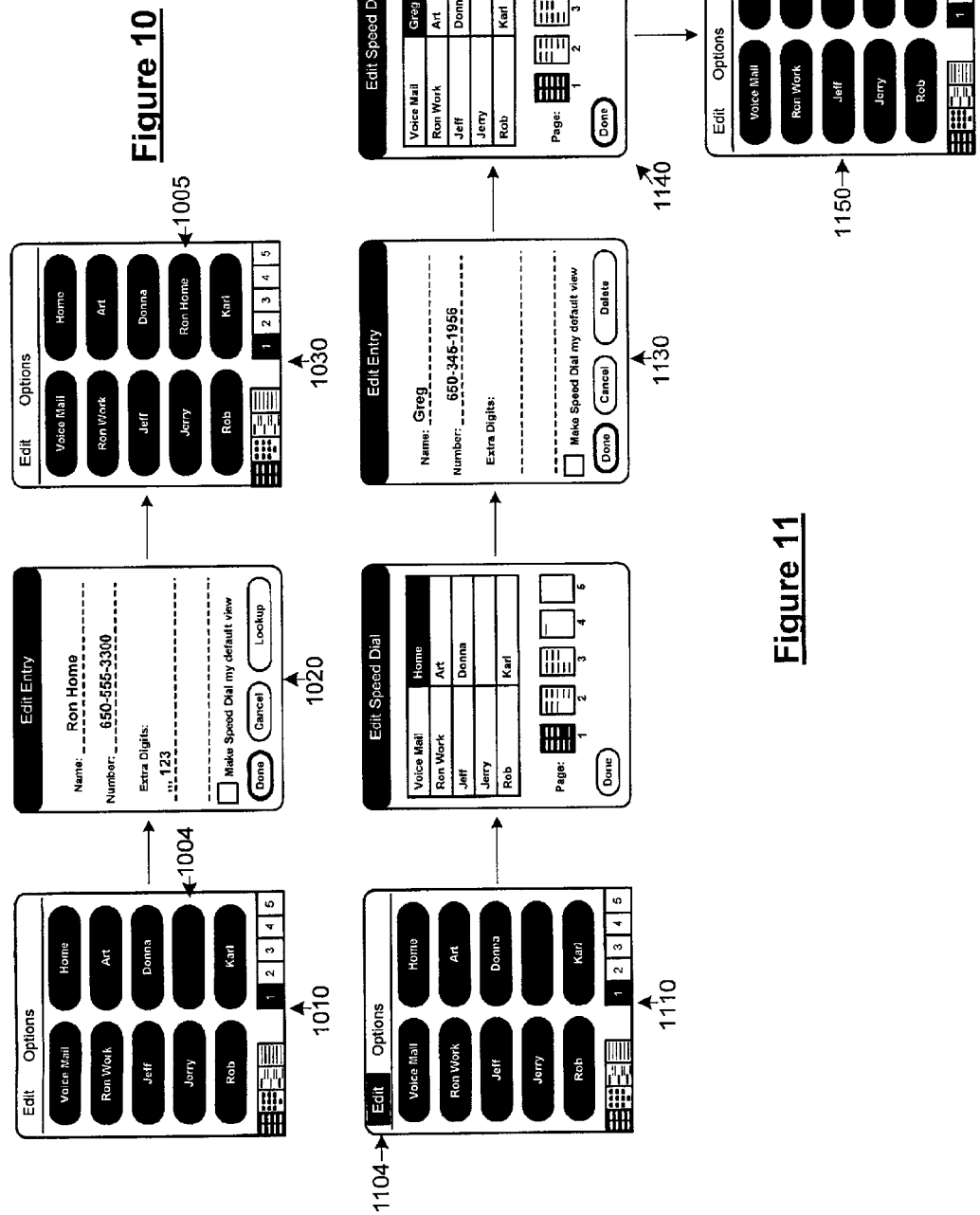

METHOD AND APPARATUS FOR ACCESSING A CONTACTS DATABASE AND TELEPHONE SERVICES

RELATED APPLICATIONS

This patent application is a continuation-in-part of the U.S. patent application entitled "Method and Apparatus for Organizing Addressing Elements", having Ser. No. 09/668,123, filed Sep. 21, 2000, now U.S. Pat. No. 6,781,575 B1.

FIELD OF THE INVENTION

The present invention relates to the field of computer-human interfaces. In particular the present invention relates to a graphical interface for operating a computer based telephony device and an interface for accessing names and telephone numbers from a contacts database.

BACKGROUND OF THE INVENTION

Handheld information organization and communications devices are becoming increasingly popular for both business users and more general users. For example, handheld computer systems such as the 3Com line of Palm handheld computers, the Handspring Visor line of handheld computer systems, and the Microsoft PocketPC have found widespread acceptance amongst people for the purpose of organizing their calendars and storing personal contact information. Typically, these handheld computer systems contain Personal Information Management (PIM) applications such as an address book, a calendar application, a memo application, and a To-Do list application. Such handheld computer systems are very popular because they are small enough to be carried all the time and do not require any "boot" time before entering an operational state. Thus, such handheld computer systems allow constant easy access to a large amount of personal information.

Sales research has indicated that having a simple intuitive method of quickly accessing the personal information data is one of the most important aspects of a handheld computer system. Due to its simple elegant design and efficient operation, handheld computer systems based upon the Palm Operating System (PalmOS) have captured a large proportion of the handheld computer system market. With the PalmOS, a user can select and manipulate data in a number of different ways. For example, a user may use up/down scroll buttons, a user may select an item displayed on a touch screen, and a user may scroll through different category lists by repeatedly pressing an application button.

One of the most important applications of handheld computer systems is to hold personal information. For example, an addressbook application is used to store and access a list of acquaintances and contact details. To satisfy consumers, it would be desirable to create new useful interfaces that allow a user to select and arrange items in such lists quickly and in a simple manner.

SUMMARY OF THE INVENTION

The present invention discloses a powerful yet simple and intuitive telephone system user interface. The telephone system user interface of the present invention provides both familiar and powerful user interfaces to the user. In one embodiment, the user is presented with four permanently available user interface views and a fifth user interface view that is available when there is an active telephone call.

The first permanently available user interface view is a dial pad view that is similar to a common touch tone dial pad. However, the dial pad view has added functionality and may automatically switch to other views as needed.

A second permanently available user interface view is a speed dial view. The speed dial view allows users to easily create their own customized speed dial buttons that are easy to navigate between and can be edited at any time. The system may automatically switch from the speed dial view in certain circumstances.

The third user interface view is the call history view. The call history view displays a list of previous incoming, outgoing, or missed calls and may be filtered as desired. As with the previous two views, the system may automatically switch from the call history view to another user interface view as necessary.

The final permanently available user interface view is a contacts view. The contacts view provides a powerful filtering mechanism that allows the user to quickly and intuitively search through a large personal contacts database.

The fifth user interface view is the active call view. The active call view displays a set of command buttons for accessing advanced telephone features during a telephone call such as hold, three way calling, DTMF touch tones, hang-up, speakerphone, etc.

Other objects, features, and advantages of present invention will be apparent from the company drawings and from the following detailed description.

BRIEF DESCRIPTION OF THE DRAWINGS

A preferred embodiment of the present invention is described in detail hereinafter, by way of example only and with reference to the accompanying drawings, in which:

FIG. 3A is a front isometric view of an integrated stylus-based handheld computer and cellular telephone system;

FIG. 3B is a rear isometric view of an integrated keyboard-based handheld computer and cellular telephone system;

FIG. 9A illustrates one possible embodiment for a display arrangement for a telephone speed dial record creating user interface;

FIG. 9B illustrates one possible embodiment for a display arrangement for a telephone speed dial record editing user interface;

FIG. 10 illustrates a series of user interface screens navigated by a user when creating a new speed dial entry in an empty speed dial slot;

FIG. 11 illustrates a series of user interface screens navigated by a user when creating a new speed dial entry in a speed dial slot that already has a current speed dial record;

DETAILED DESCRIPTION OF THE PREFERRED EMBODIMENT

A method and apparatus for accessing a contacts database and telephone services is herein disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer and cellular telephone systems. However, the same techniques can easily be applied to other types of telephony devices such as non mobile telephone systems.

Handheld Computer and Wireless Communication Devices

Figure 1A:
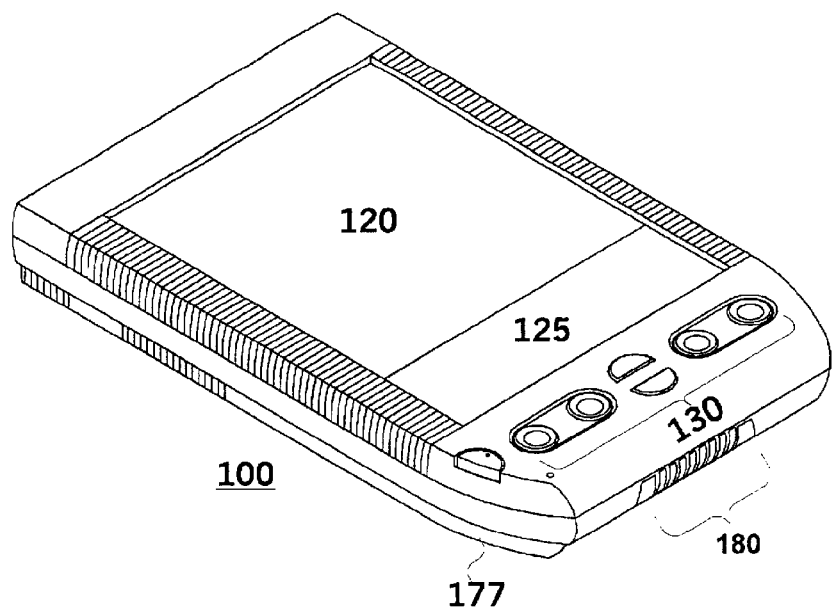
FIG. 1A is a front isometric view of a handheld computer system on which an embodiment of the present invention may be implemented.
Figure 1B:
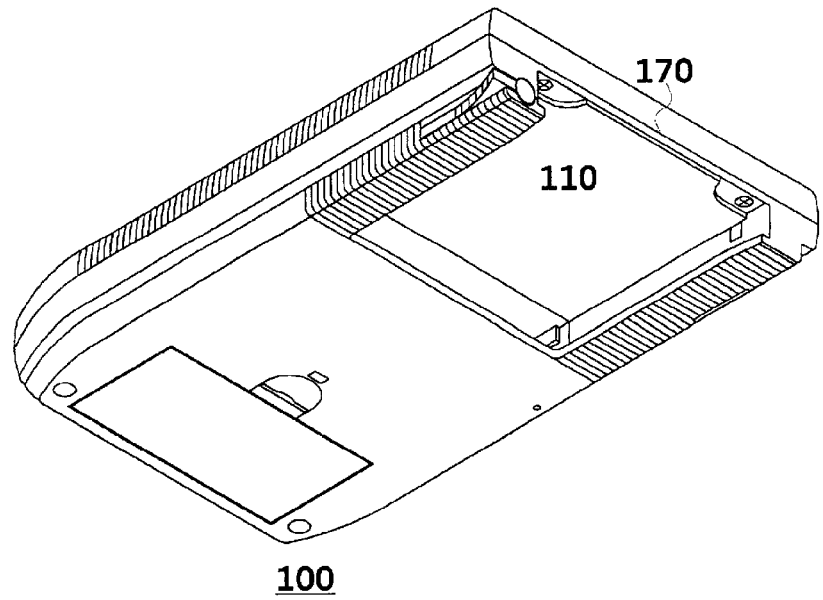
FIG. 1B is rear isometric view of the handheld computer system of FIG. 1.

FIGS. 1A and 1B illustrate a first handheld computer system 100. As illustrated in FIG. 1A, the front of the handheld computer system includes a display area 120 and several physical buttons 130. The display area 120 includes a visual display device, such as a liquid crystal display for presenting information to the user. A user may manipulate the physical buttons 130 to input information into the handheld computer system 100 and make selections of information presented on the display area 120. In a preferred embodiment, the display area 120 may also be covered with a digitizer pad that can be utilized by the user to enter information to the computer system using a stylus (not shown) or a finger.

In operation of the preferred embodiment, the display area 120 displays information to the user of the handheld computer system 100. The user is then able to employ a stylus or a finger to manipulate and interact with the displayed information by touching the digitizer pad overlaid on top of the display device. In one mode of operation, the stylus can be used in the manner of a writing pen to enter characters and figures by drawing the stylus across the digitizer pad. In one embodiment, the user is instructed to enter text into a specific area 125 of the digitizer pad. The stylus and digitizer may function like a computer mouse to operate and manipulate interactive elements on the display. For example, the computer system may present a virtual button in a location on the display that can be activated to perform an associated function by the user tapping the stylus or a finger on the digitizer pad at the virtual button location. The stylus can also be used to perform "drag and drop" operations in the fashion known in the use of a computer mouse.

The handheld computer system 100 also includes an expansion connector slot 110, seen in the rear view of FIG. 1B. The expansion connector slot allows peripheral devices to be connected to the computer system to interact therewith. Many kinds of peripheral devices can be connected to the handheld computer system 100 through the expansion connector slot 110 including, GPS receivers, memory modules, pager modules, and cellular telephone transceivers.

Figure 2:
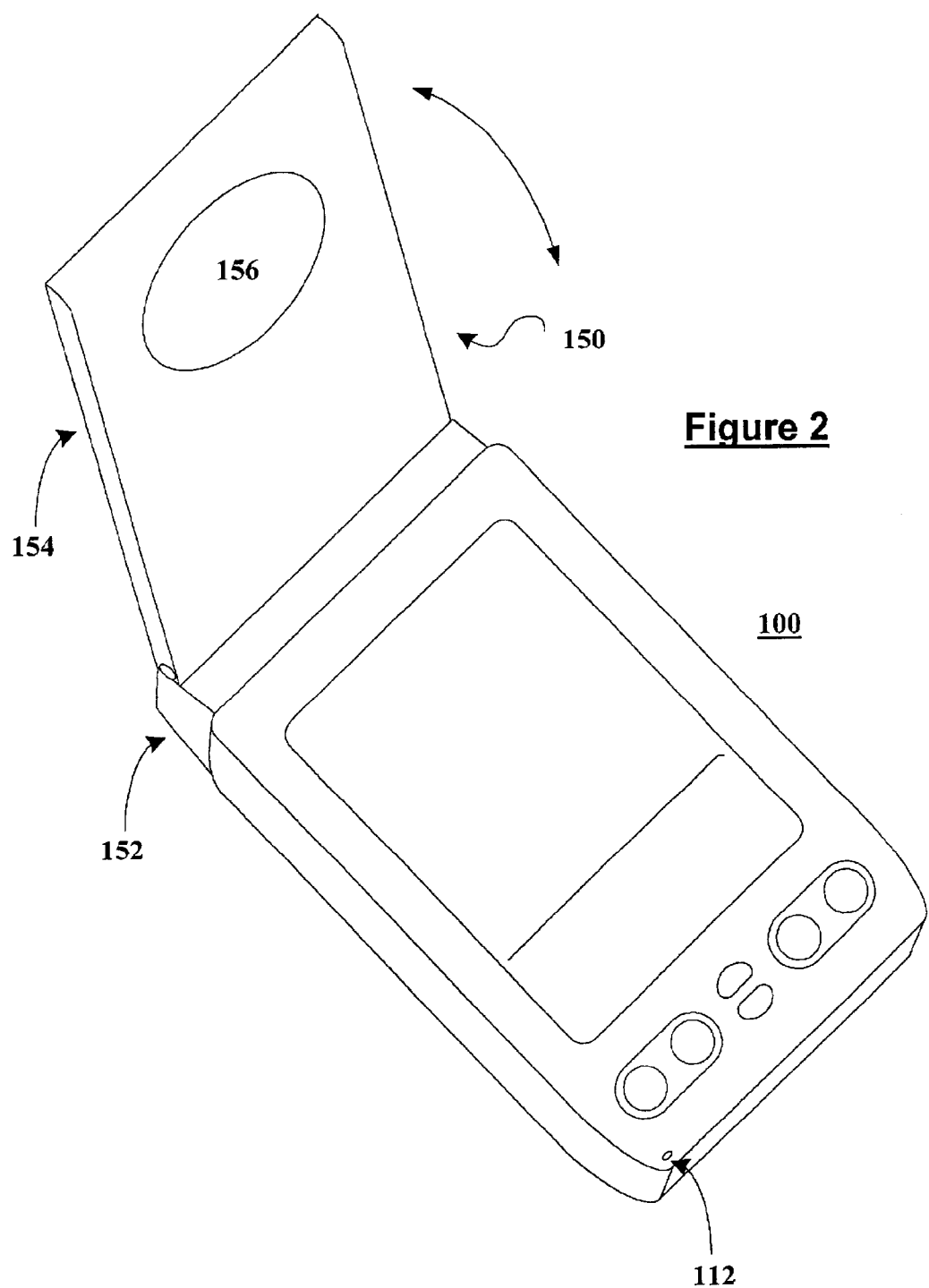
FIG. 2 is a front isometric view of the handheld computer system of FIGS. 1A and 1B equipped with a wireless communications peripheral attachment.

FIG. 2 illustrates an isometric view of a handheld computer system 100 as described above, with a cellular telephone transceiver 150 coupled thereto by the expansion connector slot 130. The cellular telephone transceiver 150 comprises a first portion 152 that is fixed to the body of the handheld computer system and a second portion 154. The second portion 154 of the radio telephone device is hingedly coupled to the first portion 152 to allow it to pivot from a closed position where it covers the display area 120 to an open position as shown in FIG. 2. When in the open position, a speaker 156 in the second portion of the cellular telephone transceiver 150 can be held proximate to the ear of the user while the user speaks into a microphone 112 provided in the handheld computer system 100.

The cellular telephone transceiver 150 includes circuitry for enabling communications with a cellular telecommunications network and processing circuitry that, together with onboard software or firmware, allows the cellular telephone transceiver 150 to interact with the handheld computer system 100. Various aspects of a handheld computer system and interconnected cellular radio telephone are described in co-pending patent Application Ser. No. 09/374,095 filed Aug. 12, 1999 and entitled "A Mobile Computer System Designed for Wireless Communication Expansion". The disclosure of that co-pending patent application is hereby expressly incorporated herein by reference.

It will be appreciated that the handheld computer system 100 and functions of the cellular telephone transceiver 150 operate principally under the control of computer software. The handheld computer system 100 includes a microprocessor and built-in software that provides application programs for the user. The cellular telephone transceiver 150 may also include a microprocessor, together with software code and data specifically required for the telephone functions. In a preferred embodiment, a computer software phone application that provides the user interface functions for the cellular telephone transceiver peripheral 150 executes on the handheld computer system microprocessor. However, the software code may be permanently stored in either the handheld computer or the cellular telephone transceiver peripheral 150. Similarly, data used by the phone application can be stored in either device, although it is preferred that acquaintance contact data and the like be stored in the handheld computer system so that it may be accessible by the user even when the cellular telephone transceiver peripheral 150 is coupled to the handheld computer system 100.

Integrated Handheld Computer and Wireless Communication Devices

To reduce the number of devices that a user needs to carry around, a number of integrated handheld computer systems and cellular telephones have recently been introduced. FIGS. 3A and 3B illustrate one embodiment of an integrated handheld computer and cellular telephone system 300. The integrated handheld computer and cellular telephone system 300 includes a keyboard 330 such that the user may easily enter names, addresses, phone numbers, and email messages into application programs running on the integrated handheld computer and cellular telephone system 300.

Figure 3C:
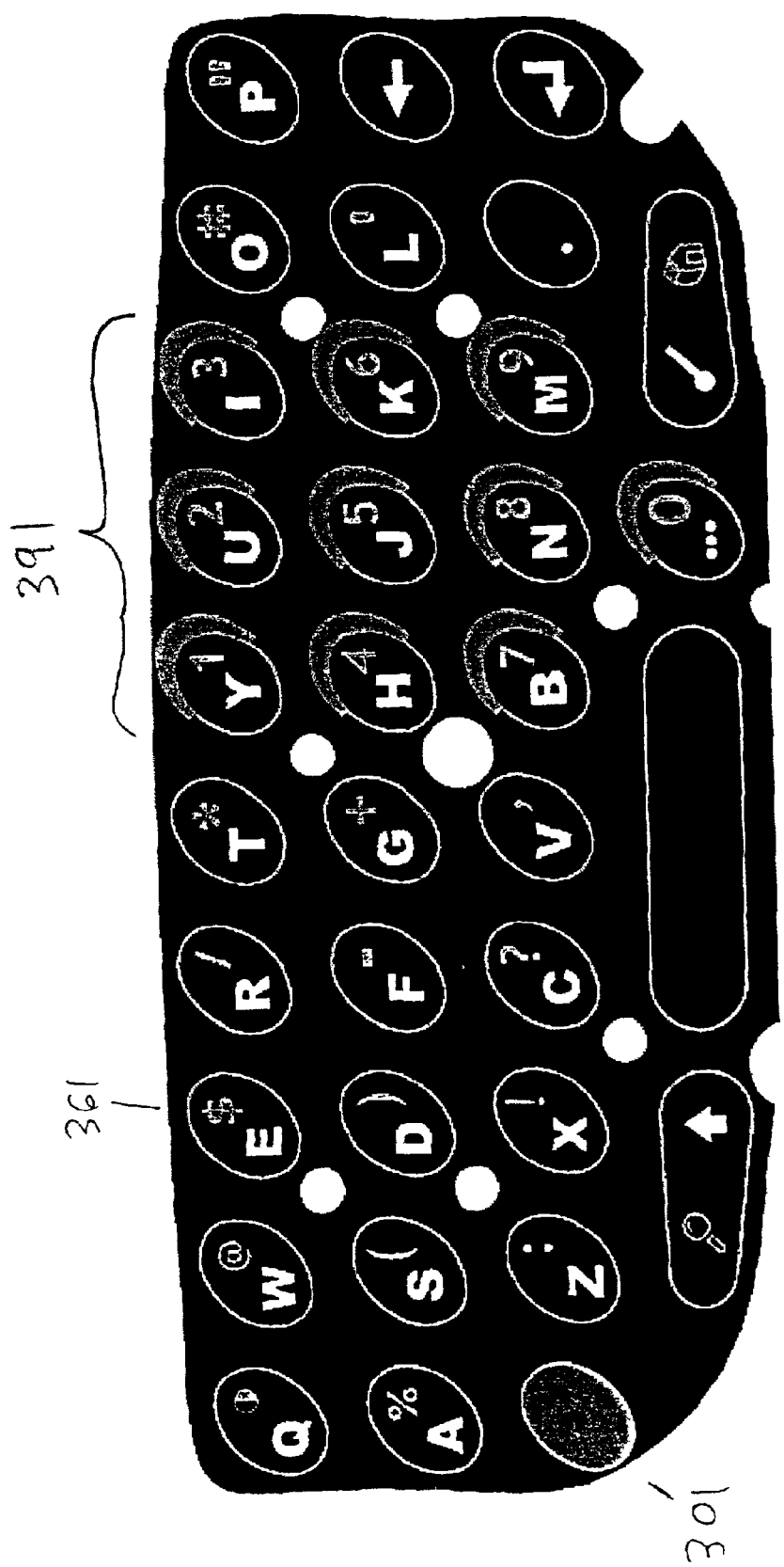
FIG. 3C illustrates one embodiment of a keyboard layout for the handheld computer and cellular telephone system of FIGS. 3A and 3B.

FIG. 3C illustrates one possible embodiment for a keyboard that may be used in the handheld computer and cellular telephone system 300 of FIGS. 3A and 3B. The keyboard of FIG. 3C includes an option key that is used to generate secondary characters from the various keys. For example, the "E" key 361 normally generates an "E" character. But if the "E" key 361 is pressed while simultaneously holding the option key 301, then the "$" character will be generated.

The keyboard of FIG. 3C also includes a digit dial pad area 391. The digit dial pad area 391 is laid out like a conventional touch-tone telephone dial pad. In this manner, a user may dial telephone numbers using the familiar mechanical touch-tone telephone dial pad. Note that the digit dial pad area 391 uses the same keys used for various letters. To explicitly generate a number, a user should press the option key 301 in order to generate a numerical digit from the keys in the digit dial pad area 391. However, the software in the handheld computer and cellular telephone system 300 may interpret any key press in the digit dial pad area 391 as a numerical digit in certain contexts whether or not the option key 301 is depressed. For example, if the user is entering a telephone number in a telephone number input field of a contact record, any key press from the digit dial pad area 391 will be interpreted as a numerical digit whether or not the option key 301 is depressed.

In an alternate integrated handheld computer and cellular telephone embodiment (not shown), the alternate integrated handheld computer and cellular telephone system lacks the keyboard 330 of FIG. 3A. In such an embodiment, the user enters text and numerical information using a stylus as set forth in the handheld computer system of FIGS. 1A and 2.

Telephone Terminal User Interfaces

It has been found that cellular telephone users are very dependent upon "speed dial" features in their cellular telephones. A typical cellular telephone has a non-volatile memory for storing the names and associated telephone numbers for a plurality of the user's acquaintances. The telephone speed dial user interface then allows the user to place a telephone call to one of the stored telephone numbers relatively quickly and easily.

Existing mobile telephone speed dial systems can operate in a variety of ways. One such speed dial system allows the user to associate a telephone number with a unique one or two digit code. The user can then dial the number by entering the one or two digit code followed by the "SEND" key to place the speed dial call. Other systems allow a single digit speed dial number to be dialed by pressing and holding the associated digit key. In order for this system to be effective, the user must memorize the codes associated with the telephone numbers.

Another existing speed dial system allows the user to utilize letters associated with keys on the telephone keypad to spell out the name of the person associated with a stored telephone number. This can be a tedious process since typically three or four letters are assigned to each button on the telephone keypad, which necessitates several key presses for each of the letters in the name spelt. Once names have been entered, the names may be displayed on the telephone screen. The user may then use an input device to scroll up and down the list to select a desired name and thereby dial the associated telephone number. With a long list of names, it becomes very cumbersome to scroll through the list.

With the advent of more sophisticated combined handheld computer and cellular telephone systems, the telephone dialing aids can become much better. The present invention introduces telephone directory methods for quickly and intuitively allowing the user of a combined handheld computer and cellular telephone system to locate and dial the telephone number of a desired. Specifically, the present invention provides a telephone application having a user interface that gives a user multiple different views of information that allow a user to make telephone calls in a simple intuitive manner.

Figure 4:
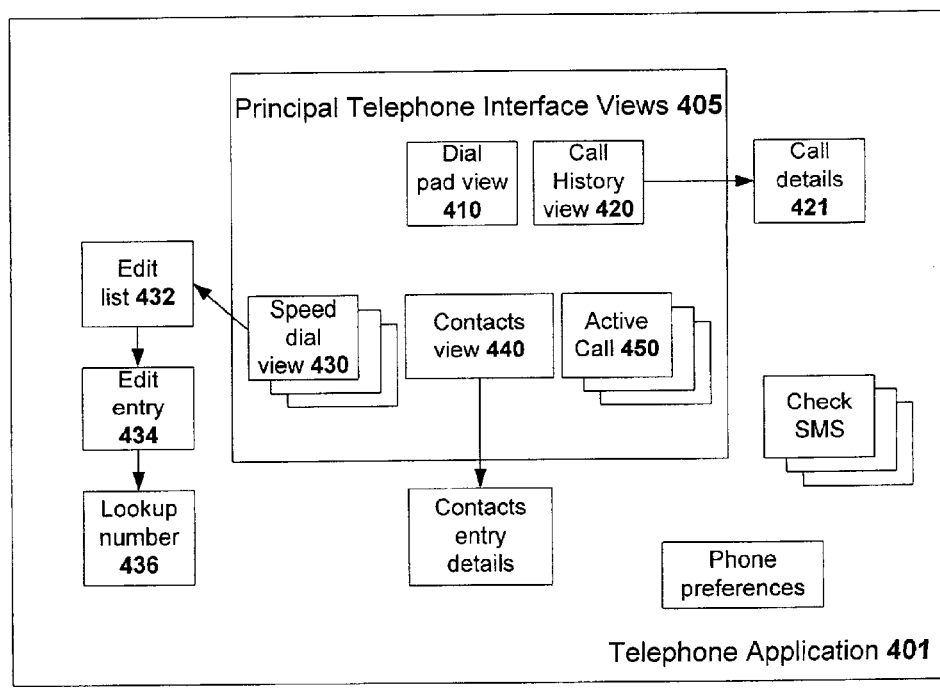
FIG. 4 is a functional block diagram of a telephone user interface software application.

The telephone user interface of the present invention comprises four permanently available views and a fifth view that is available when there is an active incoming or outgoing telephone call. The five different views consist of: a speed dial view, a dial pad view, a contacts view, a call history view, and an active call view. FIG. 4 illustrates a conceptual diagram of the telephone application 401. As illustrated in FIG. 4, the telephone application 401 consists of a set of principal telephone interface views 405 that include the dial pad view 410, call history view 420, speed dial view 430, contacts view 440, and active call view 450.

In a preferred embodiment, certain events will cause the telephone application to automatically switch between different views. For example, when an incoming telephone call is detected, the telephone application will automatically switch to the active call user interface view in order to show the user information about the incoming telephone call.

Another event that may cause the telephone application to automatically switch between different views is the entry of characters from an input device such as a keyboard or stylus and digitizer pad. In one embodiment, the entry of an alphabetic character will cause the telephone application to move to the contacts user interface view that is used to search a database of personal contact information. The contact user interface view will then begin to filter through the contact database using the entered character(s) as a search string. Similarly, the entry of a digit may cause the telephone application to automatically switch to the dial pad user interface view. Additional information on the various automatic user interface view switches can be found in the sections on each different interface view.

Dial Pad View

Figure 5A:
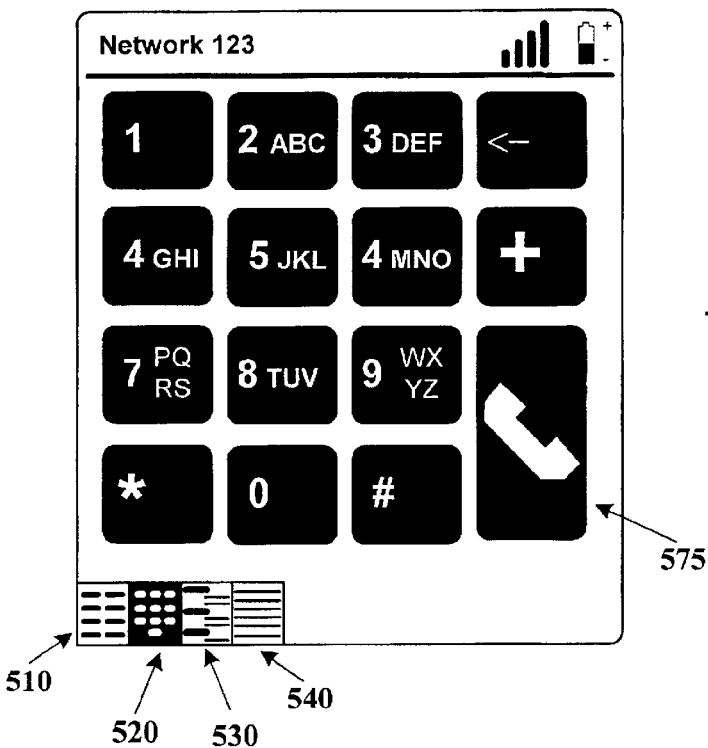
FIG. 5A illustrates one possible embodiment for a display arrangement for a telephone dial pad user interface view.

The dial pad user interface view 410 provides a conventional DTMF (Dual Tone Multiple Frequency) touch tone dial pad interface to users such that users may make outgoing telephone calls with a familiar interface. FIG. 5A illustrates one embodiment of the dial pad view. Although the dial pad user interface view is probably the most familiar telephone application view to new users, the dial pad user interface view is probably the least efficient of the various different telephone application user interface views. In one embodiment, the dial pad user interface view is set up as the initial user interface view for the telephone application in the handheld computer and cellular telephone system since most users will be very familiar with the dial pad user interface view. However, the user may later select another view for more efficient telephone number dialing.

When a user is in the dial pad user interface view, a user can touch the touch-tone buttons presented on the screen as illustrated in FIG. 5A to dial a telephone number. Pressing the telephone icon will send the entered digits to the cellular telephone network to initiate a telephone call.

The dial pad view of FIG. 5A may be invoked even when there is an active telephone call. In this manner, the dial pad view may be used to enter DTMF touch-tones in order to access interactive telephone response system such as a voicemail system or a telephone banking system.

In one embodiment, when a user begins entering a telephone number, the telephone number being dialed is placed in the title bar 590. The user may also access the last ten dialed telephone numbers by scrolling up or down. Specifically, hitting the scroll up or down key will move through the last ten numbers dialed and individually display each number in the title bar area 590.

In the lower left corner of the dial pad view illustrated in FIG. 5A, the user interface includes four buttons for accessing the four permanently available user interface views. Specifically, the buttons include a speed dial view button 510, a dial pad view button 520, a contacts view button 530, and a call history view button 540. Note that the dial pad view button 520 is shown highlighted by inverted graphic colors since the dial pad view is the current active view. To select any of the other telephone application user interface views, the user merely selects the associated view button 510, 530, or 540. The user may also repeatedly press an application button associated with the telephone application to rotate through the various telephone application user interface views (including the active call view if there is an active call.).

Figure 5B:
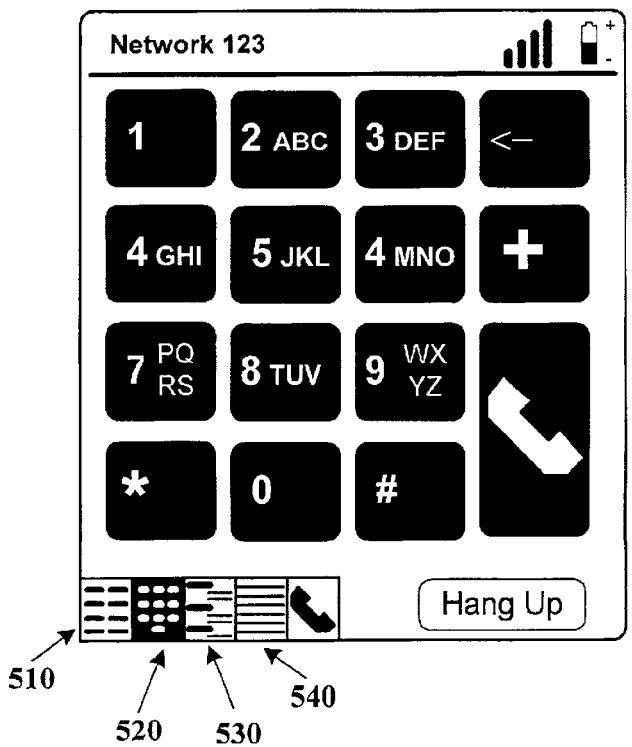
FIG. 5B illustrates the telephone dial pad user interface view of FIG. 5A when there is an active telephone call.

As previously set forth, a fifth user interface view is available when there is an active telephone call. FIG. 5B illustrates a fifth user interface view button known as the active call view button 550 used to access an active call user interface view (that will be described later). Active call view button 550 is only available when there is an active telephone call.

If the handheld computer and cellular telephone embodiment includes a keyboard 330 as illustrated in FIG. 3A, then the user may dial a telephone number using the keyboard 330. If the keyboard contains keys that may be interpreted as a letter or a digit, as is the case with the dial pad area 391 of the keyboard illustrated in FIG. 3C, then the keystrokes entered from the keys in the dial pad area 391 of the keyboard will be interpreted as numbers when in the dial pad view in the preferred embodiment. Letter keystrokes will be ignored.

In an alternate embodiment, the dial pad user interface view is used to provide the user with an easy means of entering telephone numbers that use letter mnemonics. For example, 1-800-FLOWERS is a floral service that uses the letter mnemonic 1-800-FLOWERS in order to have potential customers easily remember the contact telephone number. However, dialing a telephone numbers with letter mnemonics can be quite difficult since the user must search the telephone dial pad in order to locate the DTMF key with the desired letter. In order to allow the user to quickly enter such telephone numbers, one embodiment allows the user to enter the letters directly and the computer will translate the letters into the proper associated DTMF tones. For example, if the text for "FLOWERS" were entered, the DTMF tones associated with dial pad numbers "3549377" would be generated. (See the alphabet to DTMF key mapping illustrated in FIGS. 5A and 5B.)

Certain aliasing may occur in such an alternate embodiment. However, an intelligent program could use certain heuristics to determine the desire number in most circumstances. For example, if the user were to dial the full number "1800FLOWERS" without using the option key 301 to specify the "1800" portion as numbers, the system would not know if the first four digits should be numbers ("1800") or letters that should be translated into associated DTMF tones ("YN00" equivalent to dial pad numbers "9400"). But a heuristic could be used to always translate the "YN00" patter into the common 1800 prefix for eleven digit numbers.

The "FLOWERS" portion would easily be recognized as a letter mnemonic in an embodiment that uses the keyboard of FIG. 3C since none of the letters in "FLOWERS" is on the same key as a number. However, the letter mnemonic of "LAWYERS" is ambiguous since the letter "Y" and the number "1" are on the same key on the keyboard of FIG. 3C. In such circumstances, the system could use the heuristic that "All ambiguous letter/number keystrokes located between two certainly letter keystrokes should be interpreted as letters". Thus, since the "L" at the beginning of "LAWYERS" and the "S" at the end of "LAWYERS" can only be interpreted as letters, then all the keystrokes between those two letters ("AWYER") should be interpreted as letters.

Call History View

Referring back to FIG. 4, another one of the permanently available user interface views is the call history view 420. The call history view 420 provides a list of previous incoming, outgoing, or missed calls such that a user may use that information to make a new outgoing call.

Figure 6:
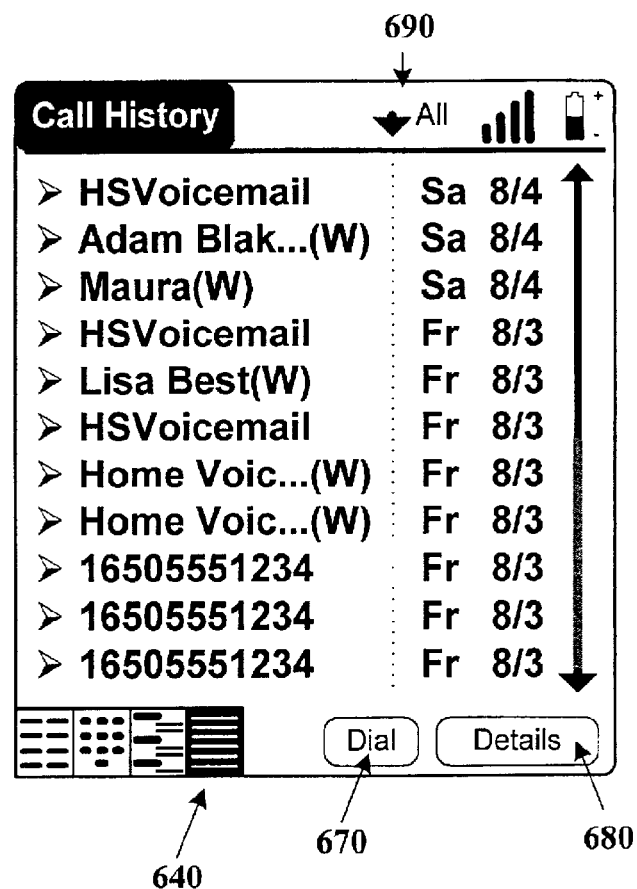
FIG. 6 illustrates one possible embodiment for a display arrangement for a telephone call history user interface view.

FIG. 6 illustrates one embodiment of the call history user interface view. As illustrated in FIG. 6, the call history provides a history of all the incoming, outgoing, and missed calls. Note that the call history view button 640 is now highlighted with inverted graphics. The user may filter the call history list may by changing the category selection 690 to select only the incoming calls, only the outgoing calls, or only the missed calls. (The "All" selection illustrated in FIG. 6 illustrates all incoming calls, outgoing calls, and missed calls.

To dial a particular number from the call history list, the user may select the call and then activate the dial button 670. Alternatively, the user may simply press the space bar or return key on the keyboard illustrated in FIGS. 3A and 3C. To obtain more information on a particular call in the call history list, the user may select a particular call from the call history list and then activate the details button 680.

If a user is in the call history view and begins entering alphabetic characters, the telephone application will automatically switch to the contacts view. Once in the contacts view, the telephone application will begin searching for a desired contact using the entered character(s) as a search string as will be set forth in the section on the contacts user interface view.

Speed Dial View

Referring back to FIG. 4, another one of the permanently available user interface views is the speed dial view 430. The speed dial view 430 provides a list of commonly called telephone numbers for quick access. Due to its simple and intuitive design, the speed dial user interface view is probably the most useful user interface view of the telephone application after the user has customized the speed dial user interface view by entering several telephone numbers into it. Thus, the user will be encourage to make the speed dial view the initial default view after some speed dial entries have been created.

Figure 7:
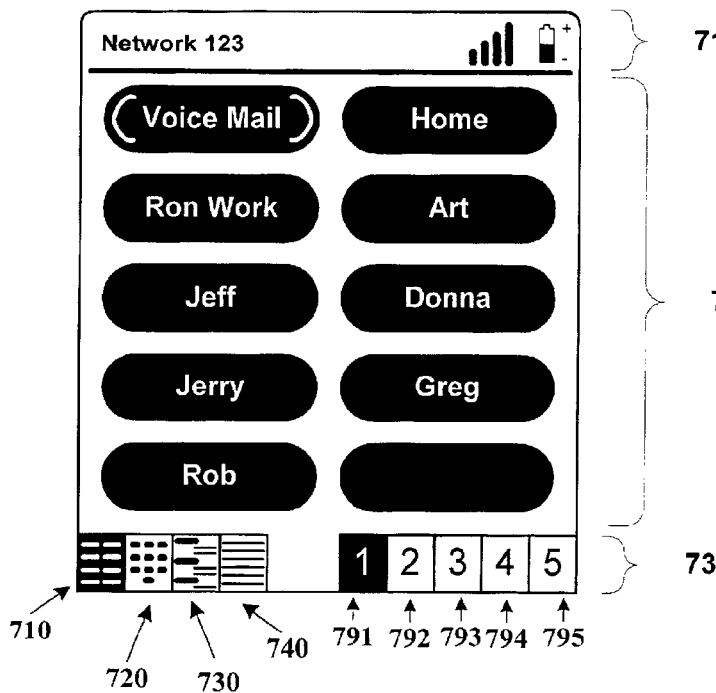
FIG. 7 illustrates one possible embodiment for a display arrangement for a telephone speed dial user interface view.

FIG. 7 illustrates one embodiment of the speed dial user interface view. Note that the speed dial view button 710 is now highlighted with inverted graphics since it is the current active view. The speed dial user interface view has a title bar 715 at the top of the screen and a command button area 735 at the bottom of the screen.

The area 725 between the title bar 715 and command button area 735 on the speed dial user interface view is occupied by ten programmable speed dial buttons. arranged in two columns of five buttons per column. Each of the speed dial buttons corresponds to a speed dial record. The speed dial record tag or label (or a portion thereof) is displayed on the screen button, and activating ("tapping") a button with a label causes the telephone application to control the handheld computer and telephone peripheral to dial the telephone number of the corresponding speed dial record. A user may customize all of the different speed dial buttons with their own personal speed dial numbers.

The speed dial user interface view of the present embodiment implements a page metaphor, whereby a plurality of speed dial "pages" are each used to store a sub-set of speed dial records. In the embodiment of FIG. 7, there are five different speed dial pages. To navigate between the different speed dial pages, there are a set of five numbered speed dial page buttons 791, 792, 793, 794, and 795 in the lower left corner of the speed dial user interface view. The currently displayed speed dial view page is the first speed dial page such that first speed dial page button 791 is highlighted with inverted graphics. Tapping on any of the other page buttons 792, 793, 794, or 795 will effect display of the contents of that page (and that page button will then become highlighted).

The user may navigate though the various speed dial entries using a scroll button. In FIG. 7, the voicemail speed dial button is highlighted with a pair of white brackets. Pressing a scroll down button would move the highlighting to the next non empty speed dial entry ("Ron Work" in this example). In one embodiment, pressing the up scroll button when the first speed dial entry is highlighted will move to a non empty speed dial button on the next non empty page of speed dial buttons (page 2 in this example assuming page 2 has a non empty speed dial button). In an alternate embodiment, pressing the pressing the up scroll button when the first speed dial entry is highlighted will move to a non empty speed dial button on the next non empty page of speed dial buttons (page 5 in this example assuming page 5 has a non empty speed dial button).

When the last non empty speed dial button of a speed dial page is highlighted ("Greg" in this example), pressing the scroll down button will move the highlight to the first non empty speed dial button of the next non empty speed dial page (page 2 in this example assuming page 2 has a non empty speed dial button.). In an alternate embodiment, pressing the scroll down button when the last non empty speed dial button of a speed dial page is highlighted ("Greg" in this example) will move the highlight to the first non empty speed dial button of the same speed dial page ("Voice Mail" in this example).

The basic operation of the telephone application from the speed dial user interface view in ordinary operation is as follows. Each of the five speed dial view pages has ten speed dial soft buttons that are user assignable. When a speed dial button has been assigned to a speed dial record by the user, that speed dial button displays the tag or label of the speed dial record. Tapping on (activating) a speed dial button causes the automatic dialing of the corresponding assigned telephone number. Tapping on a speed dial button with no number assigned (e.g. an empty button) effects display of an edit speed dial page as illustrated in FIG. 9A that allows the user to generate a speed dial record to be assigned to that button.

Figure 8:
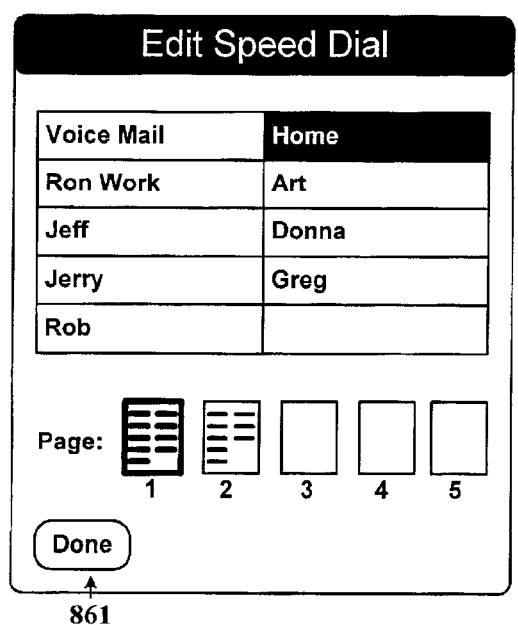
FIG. 8 illustrates. one possible embodiment for a display arrangement for a telephone speed dial page editing user interface.

Tapping on the title bar 715 of the speed dial user interface view reveals a pull down edit menu (not shown). Selecting the edit menu causes an edit speed dial page (432 in FIG. 4) to be displayed. Referring back to FIG. 4, from the speed dial view 430 the speed dial data can be entered and amended by the user through edit list 432, edit entry 434 and find number functions 436 which are described in detail hereinbelow. The layout of the edit speed dial page is illustrated in FIG. 8. The edit speed dial page provides the primary basis by which the user can arrange speed dial settings on the Speed Dial pages, edit speed dial records (434 in FIG. 4) and find telephone numbers for assignment to the speed dial buttons (436 in FIG. 4).

The Edit Speed Dial page of FIG. 8 contains a table of ten "slots" arranged in two columns of five, with each slot corresponding to a speed dial button 525 on the speed dial user interface view. There are notionally five edit speed dial pages, one for each of the speed dial view pages. The slots in the table contain the text of the tags or labels for the speed dial records assigned to the corresponding buttons. When in the edit speed dial page view, one of the slots is always "selected", and the user can change the selected slot by tapping on the corresponding position of the table. In FIG. 8 the selected slot is indicated by inverted graphic colors.

Located below the table of speed dial buttons for a page is a set of speed dial page button icons 835 that operate in a similar manner to the speed dial page buttons 791, 792, 793, 794, and 795 and allow the user to navigate amongst the five edit speed dial pages. The speed dial page button icons 835, however, are larger than the speed dial page buttons 791, 792, 793, 794, and 795 because they also display an indication of the speed dial button assignments on each of the speed dial pages. This is achieved by small horizontal lines arranged in the speed dial page button icons 835 representing speed dial buttons on that page that have assigned speed dial records in the specified locations. For example, as seen in FIG. 8, the speed dial page icon has ten horizontal lines indicated that the first speed dial page has all slots occupied and thus all corresponding speed dial buttons assigned. The second speed dial page icon indicates that that page has two "empty" slots/buttons at the lower right positions. Speed dial pages three, four, and five are all shown as empty in FIG. 8. This icon display allows the user to quickly and easily determine which pages have empty slots/buttons at a glance from the edit speed dial page view, which is particularly useful for editing and rearranging speed dial assignments as described in greater detail hereinbelow.

The edit speed dial page may also contain several command buttons at the bottom of the screen for performing specific functions. In the embodiment of FIG. 8 only a "Done" 861 command button is illustrated. Tapping on the "Done" command button 861 returns the user to the speed dial user interface view. Other command buttons may be implemented to enable other operations to be performed on the speed dial record of the selected slot.

Tapping on an empty speed dial slot from the edit speed dial page causes the display of a new speed dial edit entry page as illustrated FIG. 9A. The new speed dial edit entry page displays the data of the speed dial record for the selected slot speed dial slot. In particular, the edit entry page has a "Name" field at for displaying and editing the speed dial record tag or label, and a "Number" field at for displaying and editing the telephone number for the speed dial record. The edit entry page also has a field labeled "Extra Digits" that provides the user the ability to specify a string of DTMF touch tones that may be sent by the user after initiating a telephone call using the telephone number associated with the speed dial record. For example, for a particular telephone number corresponding to a voicemail system, the user may specify a string of DTMF touch tones in the "Extra Digits" field for accessing the user's voicemail box. In another application of the "Extra Digits" field, the "Number" may contain. a long distance service access telephone number and the "Extra Digits" field may specify a particular long distance account code.

The entry fields "Name", "Number", and "Extra Digits" in the edit entry page are each editable by the user in conventional manner on the handheld computer system 100. For example, the fields can be edited using the stylus on the touch sensitive screen or using a keyboard. When editing the "Number" or "Extra Digits" fields, the computer system may be put into a special "number lock" mode that only allows numbers or other touch tone characters such as "*" and "#" to be entered. The edit entry page has several command buttons labeled "Done" 961, "Cancel" 962, and "Lookup" 963. Tapping on the "Done" button 961 causes the telephone application to return to the edit speed dial page of FIG. 8, retaining any changes to the speed dial record made by the user. The "Cancel" button 962 effects return to the edit speed dial page of FIG. 8 but discarding any speed dial record changes. The "Lookup" button 963 allows the user to find a telephone number from the user's telephone book (to be described in the next section) to insert in the "Number" field.

Referring to FIG. 8, tapping on an filled speed dial slot from the edit speed dial page causes the display of a existing speed dial edit entry page as illustrated FIG. 9B. The difference between the new speed dial edit entry page of FIG. 9A and the existing speed dial edit entry page of FIG. 9B is that the existing speed dial edit entry page replaces the "Lookup" button with a "Delete" button that allows the user to delete the speed dial record.

One special speed dial record is a voicemail speed dial record associated with the voicemail-box of the cellular telephone itself. To prevent loss of this special speed dial record, the voicemail record associated with the voicemail-box of the cellular telephone should not be deleteable. However, the voicemail record is moveable such that the user can place the voicemail record into any available speed dial slot.

When a user is in the speed dial user interface view and begins entering alphabetic characters, the telephone application will automatically switch to the contacts view of the telephone application. Once in the contacts view, the telephone application will begin searching for a desired contact using the entered character(s) as a search string as will be set forth in the following section describing the contacts user interface view.

Figure 12:
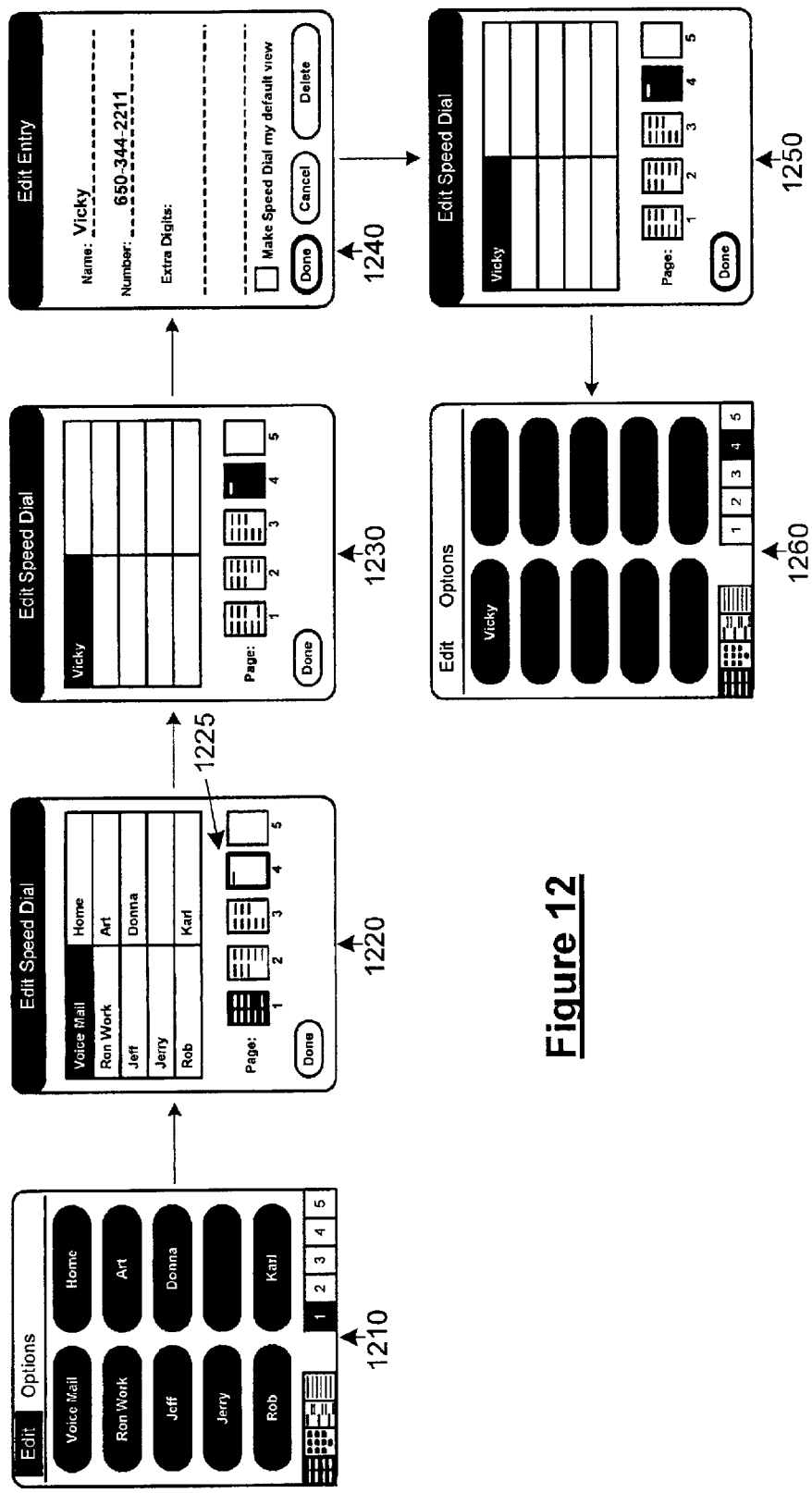
FIG. 12 illustrates a series of user interface screens navigated by a user when editing an existing speed dial entry from a different speed dial page.

FIGS. 10, 11, and 12 illustrate how the speed dial user interface view and its associated editing views can be used to create and edit speed dial records. The editing procedures are described with reference to the previously described speed dial editing screens.

FIG. 10 illustrates the creation of new speed dial button beginning from an empty button from a speed dial user interface view 1010. The user taps on an empty button 1004 that opens the edit entry page 1020 used to create new speed dial records or edit existing speed dial records. In the edit entry page 1020, the user enters data into the "Name", "Number" and optionally "Extra Digits" fields using conventional data entry means to create a new speed dial record. Tapping on the "Done" button effects return to the Speed Dial page 1030 with the previously empty button now assigned to the new speed dial record. The button 1005 now displays the Name field text, in this case "Ron Home" indicating that the speed dial button/slot is no longer empty.

A speed dial button insertion procedure is illustrated at in FIG. 11, beginning from a speed dial user interface page 1110. The user taps on the title bar of the Speed dial page and selects the revealed "Edit" menu item 1104. This cause the telephone application to bring up the edit speed dial page 1120 corresponding to the speed dial user interface page 1110. The user selects one of the slots on the edit speed dial page 1120 to edit and taps it. The telephone application then displays the edit entry page 1130, allowing the user to edit the speed dial record as previously described. The user taps on the "Done" button at the completion of the speed dial record editing to return to the edit speed dial page as shown at 1140. The selected slot now contains the edited speed dial record. Tapping on the "Done" button effects return to the corresponding speed dial page 1150, where the new speed dial record tag or label is displayed on the speed dial button.

A second speed dial record editing procedure is illustrated with reference to FIG. 12, beginning from a speed dial user interface view 1210. The user obtains the corresponding edit speed dial page 1220 through selection of the "Edit" pull-down menu item. In this case the user selects a different speed dial page to edit by tapping on the associated speed dial page icon 1225. An occupied speed dial slot on speed dial edit page 1230 is selected by tapping on it to transition to the edit entry page 1240 containing the speed dial record data for the selected speed dial slot. The user is then able to edit the speed dial record data as desired. After completing the desired edits, the user taps the "Done" button to store the amended speed dial record. The telephone application then returns to the edit speed dial page 1250 for the fourth speed dial page. Finally, tapping on the "Done" button on edit speed dial page 1250 returns the user to the speed dial user interface view 1260 of the edited speed dial page, the fourth speed dial page in this example.

Contacts View

Referring back to FIG. 4, the final permanently available user interface view is the contacts view 440. The contacts user interface view provides the user access to a large database of contact information. Each contact record in the contacts database may contain the name, work address, home address, work telephone number, home telephone number, mobile telephone number, fax number, Internet email address, and other personal contact information.

Figure 13:
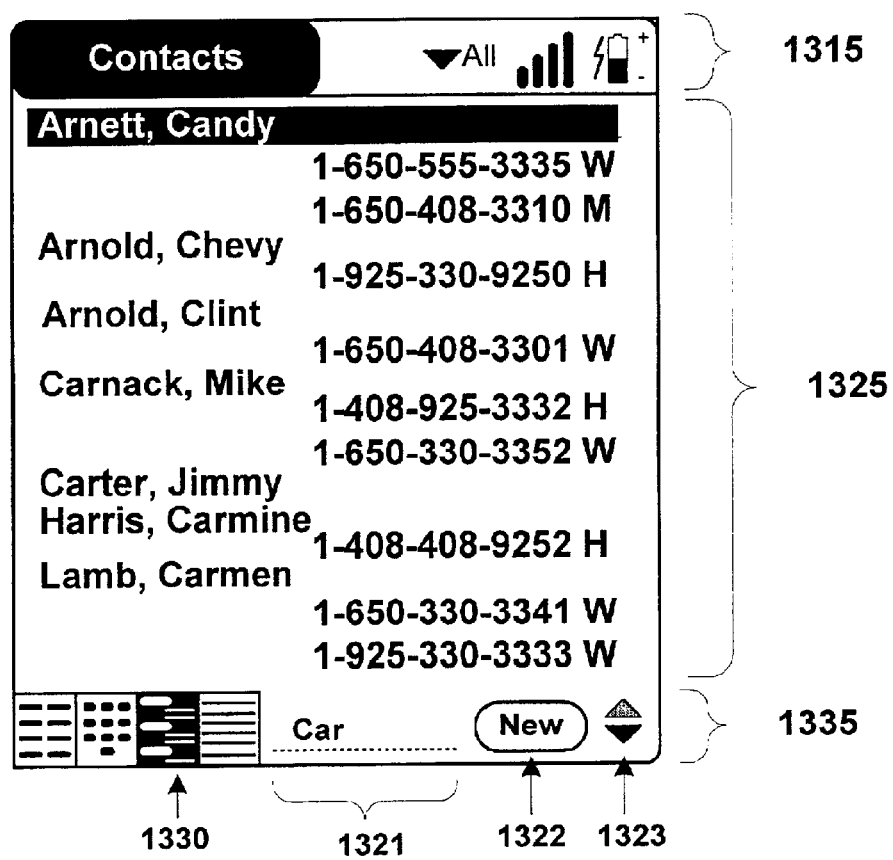
FIG. 13 illustrates one possible embodiment for a display arrangement for a telephone contacts user interface view.

FIG. 13 illustrates one embodiment of the contacts user interface view. Note that the contacts view button 1330 is now highlighted with inverted graphics. The contacts user interface view is comprised of a title bar 1315, a main area 1325, and command area 1335.

As illustrated in FIG. 13, the main area 1325 of the contacts view comprises an integrated list of names and associated telephone numbers. The names may be listed as "last-name, first-name" or "first-name last-name," as selected by the user.

Furthermore, the names will be displayed in alphabetical order using "last-name, first-name" or "first-name, last-name" as selected by the user. In the illustration of FIG. 13, the names are listed in the "last-name, first-name" display format and order. The names displayed in the main area 1325 are left justified.

The telephone numbers associated with the displayed names are displayed below the associated name and right justified. Note that by using a fill line for the name and a full line for each associated telephone number, the display will not need to abbreviate or shorten most names or telephone numbers. In a preferred embodiment, only the voice telephony telephone numbers such as a home telephone number, a work telephone number, a main telephone number, a mobile telephone number and/or other voice telephone number associated with each name is displayed. Fax numbers are not displayed since it is generally not useful to dial a fax number from the computer-based mobile telephone system. The telephone numbers are listed in the same order as the telephone numbers exist in the contact record.

In the command area 1335 of the contacts user interface view resides a pair of scroll buttons 1323, a "new" button 1322, and a search field 1321. The new button 1322 allows the user to enter a new personal contact record. The scroll buttons allow the user to scroll up and down through the list of names and telephone numbers illustrated in the main area 1325 of the contacts user interface view.

The search field 1321 allows the user to search for a particular name in the database of personal contact information. Since the contacts database may store thousands of different contacts, a powerful search mechanism is needed. However, the search system must be simple and intuitive in order to be adopted by most users. To accomplish these goals, the search field of the present invention uses a multiple filter system to search the database of personal contact information.

The search field 1321 allows a user to enter characters from a desired name. Characters may be entered in different manners as dependent upon the particular handheld system. For example, the characters may be entered using a keyboard or entered using a stylus in association with character recognition software. After each character entry, the filter system produces a filtered subset of names and associated telephone numbers from the entire contacts database. At least a portion of that filtered subset is then displayed in the main area 1325. If an alphabetic character is entered while the user is in any of the other permanent user interface screens, the telephone application will immediately open the contacts user interface view and begin a search of the contacts database.

In a preferred embodiment, the system creates a subset that contains all names having a first name that matches the entered letters (for example "GR" would match the name Greg Shirai), a last name that matches the entered letters (for example "GR" would match the name Bob Green), or a first name initial and last name that matches the entered letters (for example "GR" would match the name George Robinson). Spaces within names are ignored for matching purposes in order to use the space bar on a keyboard as the signal to dial the number. Thus, "vand" matches the last name of name Jean-Claude Van Damme. When a user deletes a character, the search will add back names that now match the shorter string. Additional details on a preferred filtering embodiment can be found in the co-pending patent application entitled "Multi-Context Iterative Directory Filter", filed concurrently with this application and hereby incorporated by reference.

Referring to FIG. 13, the user has entered the characters "CAR" in the search field 1321. The search letters "CAR" match the names "Harris. Carmine" and "Lamb, Carmen" since the letters "CAR" are in the first names of those two names. The search letters "CAR" match the names "Carter, Jimmy" and "Carnack, Mike" since the letters "CAR" are in the last names of those two names. Finally, the search letters "CAR" match the names "Arnett, Candy", "Arnold, Chevy", and "Arnold, Clint" since the letters "CAR" match the initial of the first name and the first two letters of the last name of those three names. This final filtering criteria, the matching of a first name initial and last name is one of the most powerful features of the search system because there is not a large amount of aliasing in this filter. This final filtering criteria is particular useful when searching for the contact information for a particular family member since the common last name of family members will cause undesirable aliasing. In the example of FIG. 13, if the user has family members "Arnett, Candy", "Arnett, Kevin", "Arnett, Paul" and "Arnett, Susan", only the name "Arnett, Candy" is displayed since it is the only family name that matches the "CAR" string. At any time during a search, the user may use scroll through the currently displayed search results by using scroll buttons 1323, scroll keys on a keyboard, or other scrolling input means.

As previously set forth, the telephone application may automatically open the contacts user interface view if the user begins entering characters while in the speed dial or call history view. In an embodiment that uses a keyboard containing keys that are associated with both a letter and a digit, such as the Y/1 key on keyboard of FIG. 3C, it may be considered ambiguous as to whether the user is attempting to dial a number or spell out a name. For example, the series of keystrokes N/8,Y/1, K/6, K/6, and ⅓ may be the name "Nikki" or the number "81663". In such a circumstance, the telephone application will assume that a name is being spelled out and search through the contacts database using some filtering means. However, if there is no matching contact and all the entered keystrokes were from keys that have both a letter and a digit, then the telephone application will assume the user is attempting to dial a telephone number with the key pad area 391 and automatically switch to the dial pad view and display the entered keystroke sequence as a series of digits. Thus, it is possible for a user to be in the speed dial user interface view, begin entering keystrokes, automatically switch to the contacts view, and then automatically switch to the dial pad view if the series of keystrokes were all from the dial pad area 391 and associate letters do not match any entry in the contacts database.

Referring back to FIG. 13, in the main area 1325 of the contacts user interface view, either a name (from the left-justified names) or a telephone number (from the right-justified associated telephone numbers) may be highlighted for focus. Normally, the first telephone number in the main area 1325 is initially highlighted for focus. In FIG. 13, the name "Arnett, Candy" is highlighted with inverted graphics after a user has scrolled upward. When a highlighted name is activated by pressing an enter key, a keyboard space bar, or other means, the system opens up a full contact editing screen for editing a contact record associated with the selected name. When a highlighted telephone number is activated by pressing an enter key, a keyboard space bar, or other means, then that highlighted telephone number is automatically dialed by the cellular telephone system.

In a preferred embodiment, the telephone numbers are not displayed exactly as the telephone numbers are entered into the contact record. Instead, the telephone numbers are displayed exactly how the cellular telephone will dial the number. Thus, any rules for adding or removing area codes or other prefixes or postfixes should be applied before displaying the number. Similarly, any extraneous text such as "ext. 123" should be removed.

In an alternate embodiment, the email address (if available) associated with a displayed name is also displayed. The email address may be display on its own line just as the voice telephony telephone numbers are displayed. In this manner, the user of the device may highlight and activate the email address. Activating the email address may launch an email application with an outgoing message addressed to the selected email address as an initial screen display.

Active Call View

The final main user interface view of the telephone application is the active call user interface view. The active call user interface view is only available when there is an active incoming or outgoing telephone call. The contents of active call user interface screen will be dependent upon the telephone call (incoming or outgoing) and the particular abilities of the carrier network.

In a preferred embodiment, the active call user interface view will allow the user to easily access various advanced telephone features. For example, the user may place a call on hold, initiate a three-way call, hang-up the call. enter the extra digits associated with an outgoing call, or turn on/off a speakerphone feature.

Figure 14:
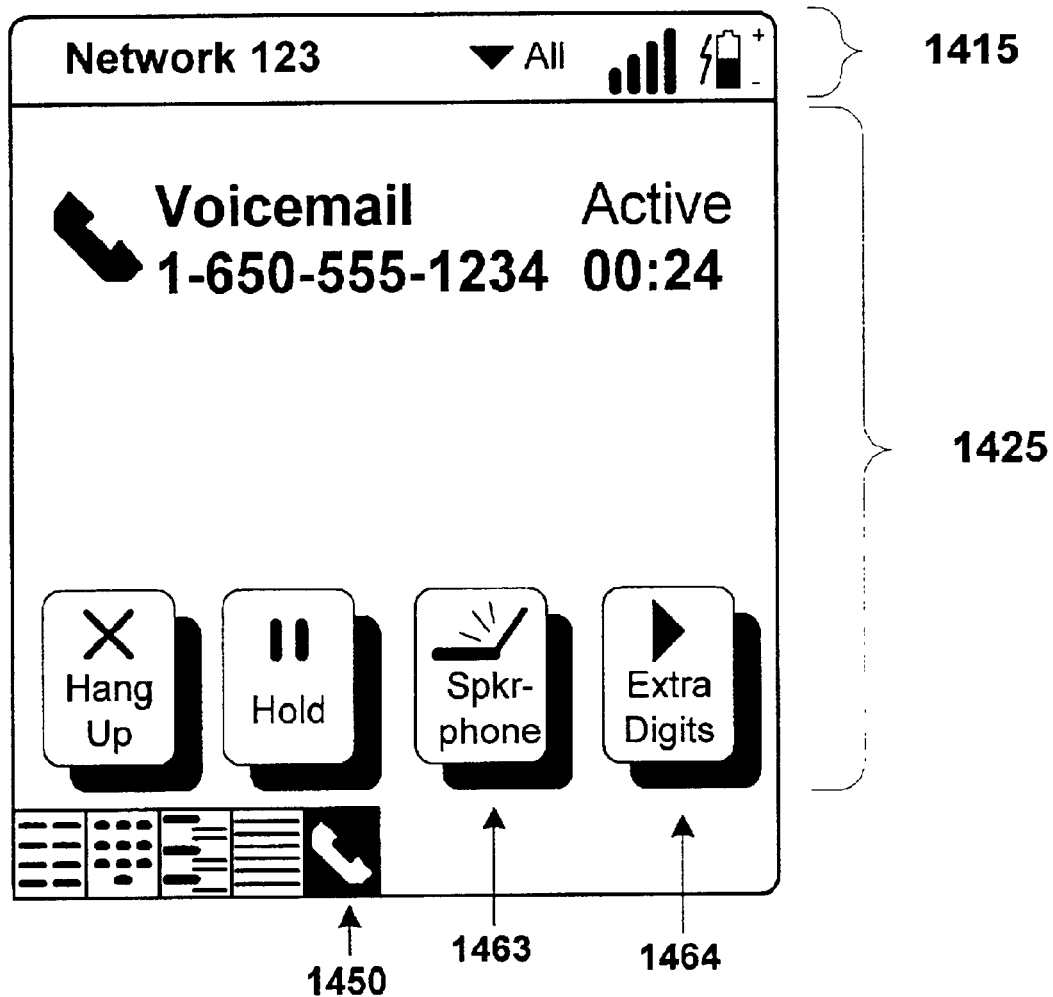
FIG. 14 illustrates a first view of a display arrangement for a telephone active call user interface view.
Figure 15:
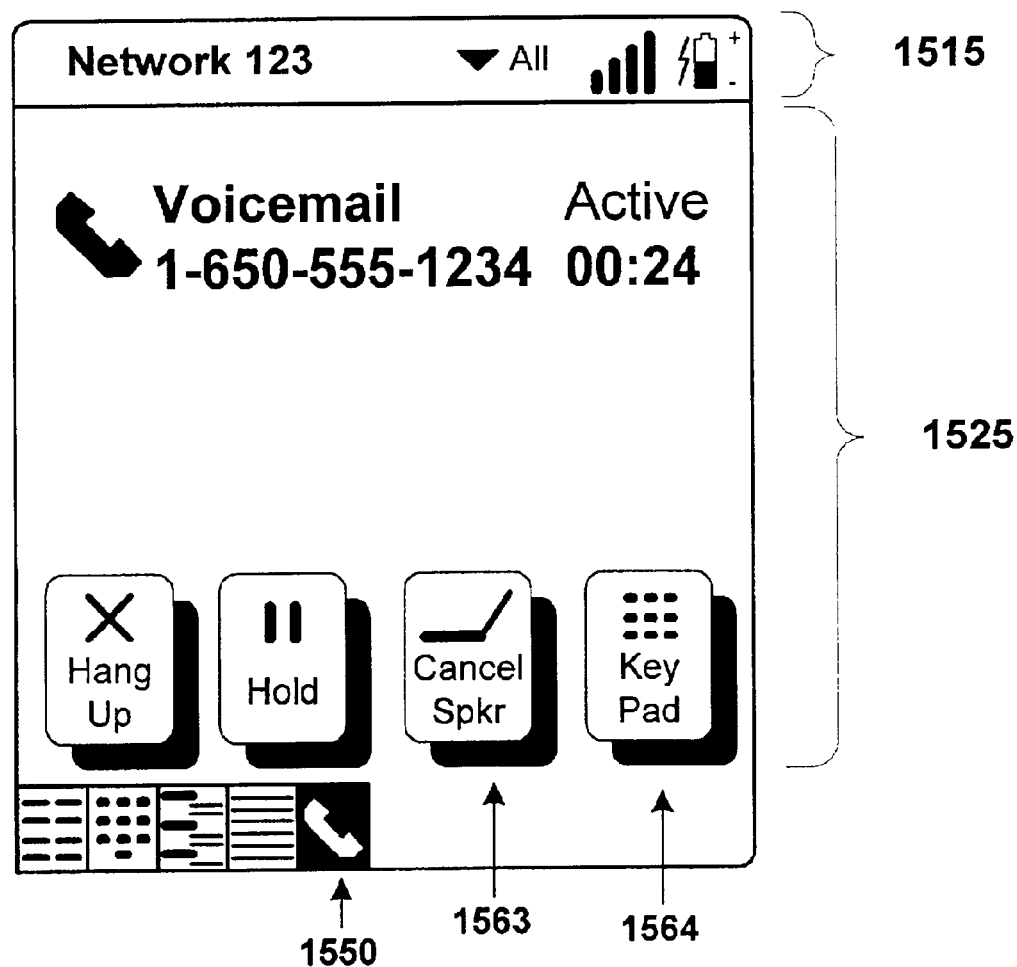
FIG. 15 illustrates a second view of a display arrangement for a telephone active call user interface view.

FIG. 14 illustrates one embodiment of an active call user interface view for an outgoing call to a voicemail system. To enter a DTMF account code or password for the voicemail system, the user can select the "extra digits" button 1464 to play the extra DTMF codes entered in the "extra digits" field of the speed dial record. The user may turn on a speakerphone feature by pressing "speakerphone" button 1463. FIG. 15 illustrates another active call user interface view.

In the active call user interface view of FIG. 15, the speakerphone is active such that the speakerphone button has been replaced with a "cancel speakerphone" button 1563. If the call was initiated using a means other than a speed dial button associated with a speed dial record with a set of "extra digits" then the active call screen will provide a key pad button 1564 that can be used to access the dial pad view such that the user may enter DTMF touch tones. If the hardware embodiment includes a keyboard with a dial pad area 391 as illustrated in FIG. 3C, then the user may simply enter DTMF touch tones by tapping the number keys in the dial pad area 391 or other keys associated with DTMF dial tones such as #, *, and +

Telephone Application Alerts

Certain events cause special alert pages to be displayed by the telephone application page. For example, when an incoming call is received, the user is presented with an incoming call alert screen.

Figure 16:
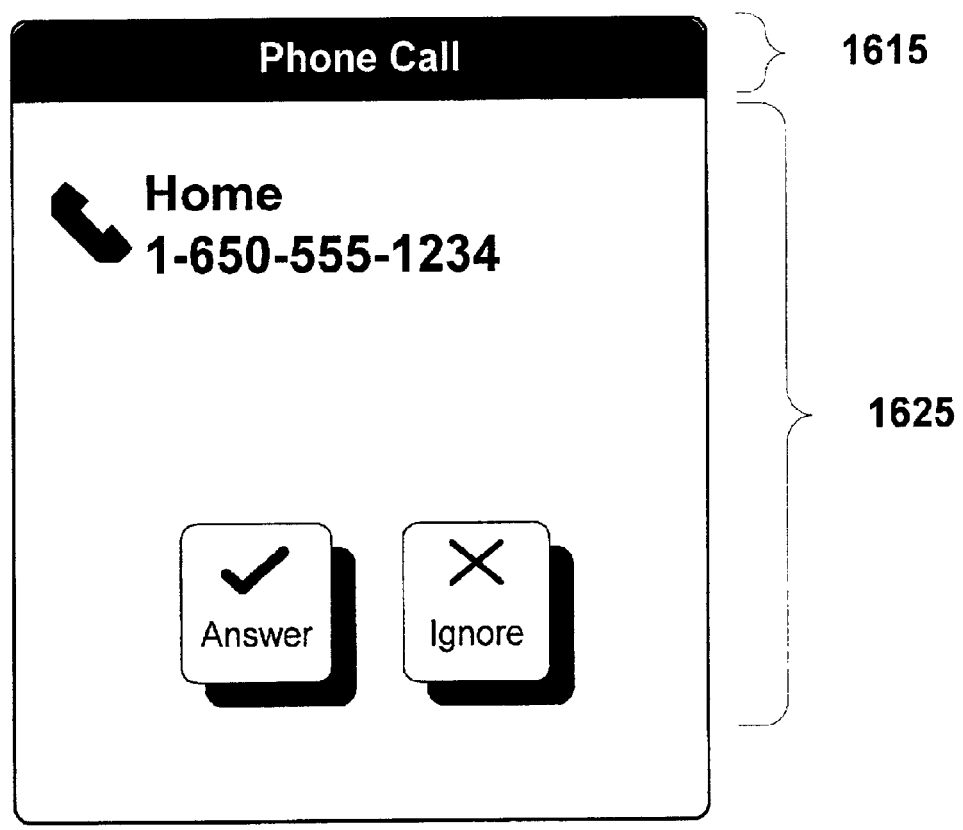
FIG. 16 illustrates an alert screen that may be display when an incoming call is received and the lid of the telephone is open.

FIG. 16 illustrates a first embodiment of an incoming call alert screen view that informs the user of an incoming call. At the top of the screen display is a message generated by a caller-id feature that specifies the telephone number of the incoming call (if available). If the incoming telephone number exists in the contact database, then the label associated with the telephone number is displayed, in this case the label "Home" is displayed. The embodiment of an incoming call screen is illustrated in FIG. 16 is delivered when the flip lid 320 of the integrated computer and cellular telephone system illustrated in FIG. 3A is open. The user may answer or ignore the incoming telephone call by touching either "Answer" or "Ignore" buttons respectively.

Figure 17:
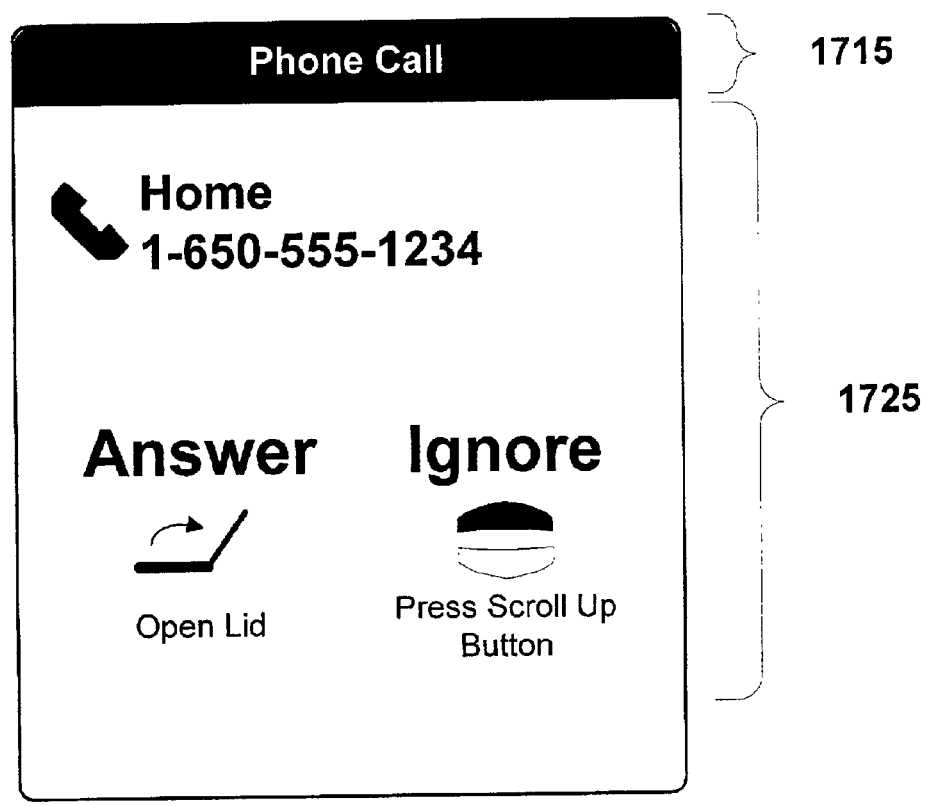
FIG. 17 illustrates an alert screen that may be display when an incoming call is received and the lid of the telephone is closed.

FIG. 17 illustrates a second embodiment of an incoming call alert screen view that informs the user of an incoming call. The embodiment of an incoming call screen is illustrated in FIG. 17 is delivered when the flip lid 320 of the integrated computer and cellular telephone system illustrated in FIG. 3A is closed. The user may answer the incoming telephone call opening the lid 320 of the integrated computer and cellular telephone system. Similarly, the user may ignore the telephone call (and thus stop the ringing) by tapping the upward scroll button.

If an incoming telephone call is received while the user is opening or closing the flip lid 320 or presses a button on the integrated computer and cellular telephone system, an undesirable action may occur. For example, if the user is opening the flip lid 320 while an incoming call is being received, then the user may inadvertently answer the telephone call without having a chance to review the caller-ID field. Similarly, a user may pressing the scroll up button just when an incoming call is and the lid is closed, this might cause the integrated computer and cellular telephone system to ignore the incoming call before the user even knew an incoming call was being received.

To prevent such undesirable effects, one embodiment of the present invention uses an input "lockout period". Specifically, one embodiment ignores all input events (such as lid opening event or a key press event) for a predefined period when an incoming call is received. Thus, if an incoming telephone call is received while a user is opening the lid, the opening of the lid will not cause the integrated computer and cellular telephone system to answer the telephone call. Instead, the system will display the interface of FIG. 16. Similarly, if the user presses the upward scroll button when an incoming call is received and the lid is closed, the button press will not ignore the telephone call. In one embodiment, the lock out period is half a second. However, it may be adjusted to a longer or shorter period of time.

The foregoing has described a method and apparatus for accessing a contacts database and telephone services. It is contemplated that changes and modifications may be made by one of ordinary skill in the art, to the materials and arrangements of elements of the present invention without departing from the scope of the invention.

We claim:

1. A method for selecting a desired subset from a list of names in a computer system, each of said names comprising a first name and a last name, said method comprising:

accepting a first desired letter input;

selecting a first subset from said list of names comprising names having a first name beginning with said first desired letter;

accepting a second desired letter input; and selecting a second subset from said first subset that have a first name beginning with said first desired letter and a last name beginning with said second desired letter.

2. The method as set forth in claim 1, said method further comprising:

displaying at least a portion of said first subset after selecting said first subset from said list of names.

3. The method as set forth in claim 1, said method further comprising:

displaying at least a portion of said second subset after selecting said second subset from said first subset.

4. The method as set forth in claim 1, said method further comprising:

accepting a next desired letter input; and selecting a next subset from a previous subset that have a first name beginning with said first desired letter and a last name beginning with said second desired letter and said next desired letter.

5. The method as set forth in claim 4, said method further comprising:

repeating said steps of accepting a next desired letter input and selecting a next subset.

6. The method as set forth in claim 4, said method further comprising:

displaying at least a portion of said next subset after selecting said next subset from said previous subset.

7. The method as set forth in claim 6, said method further comprising:

repeating said steps of accepting a next desired letter input, selecting a next subset, and displaying said next subset.

8. The method as set forth in claim 4, said method further comprising:

accepting a user input deleting said next desired letter; and selecting said second subset from said first subset that have
- a first name beginning with said first desired letter and a last name beginning with said second desired letter.

9. The method as claimed in claim 8, said method further comprising:
displaying at least a portion of said second subset after selecting said second subset from said first subset.

10. A method for providing an intuitive interface to a wireless telecommunication system, said method comprising:
displaying a first button for selecting a telephone dial pad interface for dialing a telephone number;
displaying a second button for selecting a speed dial interface for dialing a telephone number from a list of speed dial numbers;
displaying a third button for selecting call history interface for dialing a telephone number from a call history list;
displaying a fourth button for selecting a contact list interface for dialing a telephone number from a contact list;
receiving a first input selection of a first particular button from a user;
displaying a first particular interface corresponding to said first particular button; and
continuing to display said first, second, third, and fourth buttons while said first particular interface is displayed.

11. The method as set forth in claim 10, wherein said contact list comprises a list of names and telephone numbers, said names comprising a first name and a last name, said method further comprising:
accepting a first desired letter input from said user;
selecting a first subset from said list of names comprising names having a first name beginning with said first desired letter or a last name beginning with said first desired letter;
accepting a second desired letter input from said user; and
selecting a second subset from said first subset that have
- a first name beginning with said first desired letter and said second desired letter, or
- a last name beginning with said first desired letter and said second desired letter, or
- a first name beginning with said first desired letter and a last name beginning with said second desired letter.

12. The method as set forth in claim 11, said method further comprising;
displaying at least a portion of said first subset after selecting said first subset from said list of names.

13. The method as set forth in claim 11, said method further comprising:
displaying at least a portion of said second subset after selecting said second subset from said first subset.

14. The method as set forth in claim 11, said method further comprising:
accepting a next desired letter input; and
selecting a next subset from a previous subset that have
- a first name beginning with said first desired letter, said second desired letter, and said next desired letter, or
- a last name beginning with said first desired letter, said second desired letter, and said next desired letter, or
- a first name beginning with said first desired letter and a last name beginning with said second desired letter and said next desired letter.

15. The method as set forth in claim 14, said method further comprising:
repeating said steps of accepting a next desired letter input and selecting a next subset.

16. The method as set forth in claim 14, said method further comprising:
displaying at least a portion of said next subset after selecting said next subset from said previous subset.

17. The method as set forth in claim 16, said method further comprising:
repeating said steps of accepting a next desired letter input, selecting a next subset, and displaying said next subset.

18. The method as set forth in claim 14, said method further comprising:
accepting a user input deleting said next desired letter; and
selecting said second subset from said first subset that have
- a first name beginning with said first desired letter and said second desired letter, or
- a last name beginning with said first desired letter and said second desired letter, or
- a first name beginning with said first desired letter and a last name beginning with said second desired letter.

19. The method as claimed in claim 10, said method further comprising:
displaying an active call interface when said user initiates an outgoing call or receives an incoming call; and
displaying a fifth button for selecting the active call interface, the fifth button being displayed only as long as said outgoing or incoming call is active.

20. The method as claimed in claim 19 wherein said active call interface comprises a hold button to place said outgoing or incoming call on hold.

21. The method as claimed in claim 19 wherein said active call interface comprises a hang up button to hang up said outgoing or incoming call.

22. The method as claimed in claim 19 wherein said active call interface comprises an answer button to answer said incoming call.

23. The method as claimed in claim 19 further comprising:
continuing to display said first, second, third, and fourth buttons while said active call interface is displayed.

24. The method as claimed in claim 10 further comprising:
after continuing to display said first, second, third, and fourth buttons, receiving a second input selection of a second particular button from a user; and
displaying a second particular interface corresponding to said second particular button, wherein said second particular interface is displayed without requiring further input from said user.

25. The method as claimed in claim 10 wherein input is received from said user through a digitizer pad that covers said interfaces.

26. A computer system comprising:
one or more memory devices that store a set of instructions and a collection of records, wherein each record has associated with it at least one of a first name and a last name; and
one or more processors that are configured to retrieve instructions in the set of instructions from the one or more memory devices in order to:

accept a first desired letter as a first input;

select a first subset of records from the collection of records, each record in the first subset having at least one of the first name or the last name beginning with said first desired letter;

accept a second desired letter as a second input; and select a second subset of records from either the collection of records or from the first subset of records;

wherein the instructions stored in the one or more memory devices enable the one or more processors to select each record in the second subset based on any one or more of (i) the first name beginning with said first desired letter and the last name beginning with said second desired letter; (ii) the first name beginning with said first desired letter followed by the second desired letter; and (iii) the last name beginning with said first desired letter followed by the second desired letter.

27. The computer system of claim 26, wherein the computer system includes a display, and wherin the one or more processors are configured to provide on the display at least a portion of said first subset of records after selecting said first subset.

28. The computer system of claim 26, further comprising a display, and wherein the one or more processors are configurd to provide on the display at least a portion of said second subset of record after selecting said second subset.

29. The computer system of claim 26, wherein the one or more processors are programmed to:

accept a next desired letter as a next input; and select a next subset from one of the first subset of records, the second subset of records, or the collection of records, wherein each record in the next subset is selected for having one of (i) one of the first name or last name beginning with the first desired letter and the other of the first name or last name beginning with the second desired letter followed by the next desired letter input, or (ii) one of the first name or last name beginning with the first desired letter, followed by the second desired letter, followed by the next desired letter.

30. The computer system of claim 29, further comprising a display, and wherein the one or more processors are programmed to provide on the display at least a portion of said next subset after selecting said next subset.

31. The computer system of claim 29, wherein the one or more processors are configured to:

accept a user input deleting said next desired letter; and responsive to accepting the user input deleting said next desired letter, select a second subset of records from either the collection of records or from the first subset of records, wherein each record in the second subset is selected for having one of (i) the first name beginning with said first desired letter and the last name beginning with said second desired letter; (ii) the first name beginning with said first desired letter followed by the second desired letter; or (iii) the last name beginning with said first desired letter followed by the second desired letter.

32. The computer system of claim 29, further comprising a display, and wherein the one or more processors are configured to provide on the display at least a portion of said second subset after selecting said second subset.

33. The computer system of claim 26, wherein the computer system corresponds to a portable computing device.

34. The computer system of claim 33, wherein the computer system corresponds to a portable computing device with cellular communication capabilities.

35. The computer systemof claim 34, further comprising:

one or more cellular telephone mechanisms to enable a user to place or receive a cellular telephone call; and wherein the one or more processors are configured to:

accept an input to identify a single record in the second subset;

identify a phone number contained in the record; and initiate a cellular phone call to the identified phone number using the one or more cellular telephone mechanisms.

36. The computer system of claim 35, wherein the one or more processors are configured to identify the phone number contained in the record based on a user-selection of data contained in the single record.

37. The computer system of claim 36, wherein the one or more processors are configured to initiate the cellular phone call in response to a user-action.

* * * * *

UNITED STATES PATENT AND TRADEMARK OFFICE
CERTIFICATE OF CORRECTION

PATENT NO. : 7,007,239 B1
APPLICATION NO. : 09/977871
DATED : February 28, 2006
INVENTOR(S) : Jeffrey Charles Hawkins and Robert Yuji Haitani Page 1 of 1

It is certified that error appears in the above-identified patent and that said Letters Patent is hereby corrected as shown below:

Column 19, Line 18

Please delete "26" and insert --27--.

Column 19, Line 25

Please delete "configurd" and insert --configured--.

Column 19, Line 24

Please delete "systemof" and insert --system of--.

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 7,007,239 B1
APPLICATION NO. : 09/977871
DATED : February 28, 2006
INVENTOR(S) : Jeffrey Charles Hawkins and Robert Yuji Haitani It is certified that error appears in the above-identified patent and that said Letters Patent is hereby corrected as shown below:

Cover page under Related U.S. Application Data:

Please add after 6,781,575 --, and Continuation-in-Part of application no. 09/374,095 filed on Aug. 12, 1999, and now Pat. No. 6,516,202--.

Column 1, Line 6:

After "application" please add --claims benefit to and--.

Column 1, Line 9:

After "6,781,575B1" please add --This patent application claims benefit to and is a continuation-in-part of the U.S. patent application entitled "A Mobile Computer System designed for Wireless Communication Expansion," having serial number 09/374,095, filed 8/12/99, now U.S. Pat. No. 6,516,202.--

Signed and Sealed this

Fifth Day of December, 2006

JON W. DUDAS
*Director of the United States Patent and Trademark Office*